United States Patent [19]

Hydary

[11] Patent Number: 4,480,509
[45] Date of Patent: Nov. 6, 1984

[54] AUTOMATIC WIRE STRIPPER

[76] Inventor: Mainul H. Hydary, 25A Milton St., Apt. #1B, Etobicoke, Ontario, Canada, M8Y 2X7

[21] Appl. No.: 478,966

[22] Filed: Mar. 25, 1983

[51] Int. Cl.³ .............................................. H02G 1/12
[52] U.S. Cl. .................................... 81/9.5 A; 30/90.1
[58] Field of Search .......................... 81/9.5 A, 9.5 R; 30/90.1

[56] References Cited

U.S. PATENT DOCUMENTS

| | | | |
|---|---|---|---|
| 2,995,051 | 8/1961 | Redway | 81/9.5 A |
| 3,130,616 | 4/1964 | Miller | 30/91.2 |
| 3,172,133 | 3/1965 | Rizzo | 30/90.4 |
| 3,336,666 | 8/1967 | Calkin | 81/9.5 R |
| 3,893,199 | 7/1975 | Todaro | 81/9.5 R |

Primary Examiner—Roscoe V. Parker
Attorney, Agent, or Firm—Krass & Young

[57] ABSTRACT

A wire stripping tool for moving insulation from the end of electrical wiring having a first, elongate cutting member providing a first handle at one end and a first cutting edge at the opposite end thereof and a second cutting member providing a second cutting edge. Each cutting edge has a wire-receiving notch therein. An elongate insulation removing member has a second handle at one end and an insulation pulling edge at the opposite end thereof. A pin member pivotally connects together the first and second cutting members and the insulation removing member at a location close to the cutting edges. A stop member on the first cutting member prevents continued pivotal movement of the first cutting member relative to the second cutting member beyond a selected point. A spring is connected between the insulation removing member and an end of the second cutting member. The spring biases the insulation removing member to a position where the pulling edge is beside the second cutting edge. The tool is capable of pulling a severed end piece of insulation off the metal wire by a single pull of the handles towards one another.

14 Claims, 6 Drawing Figures

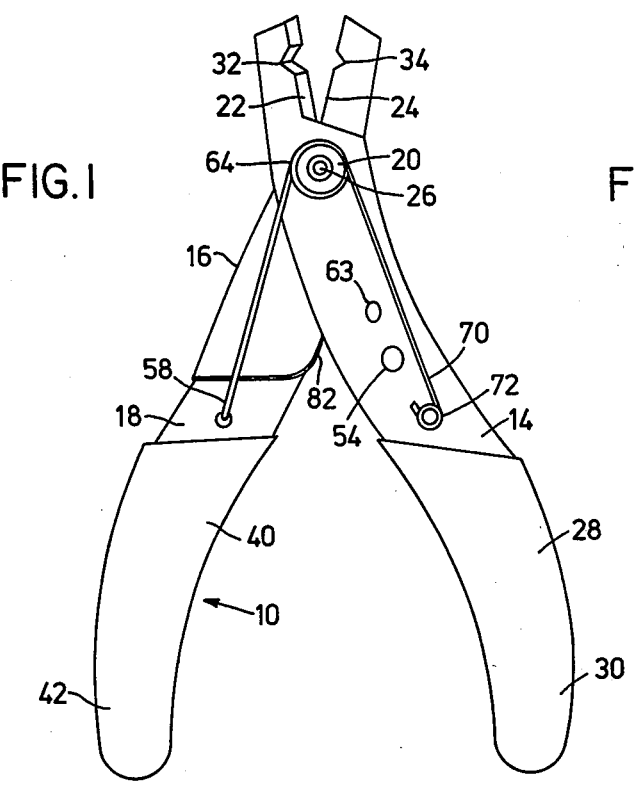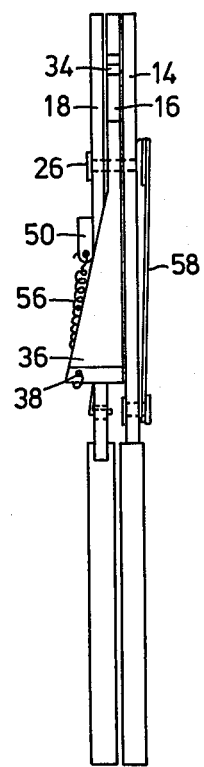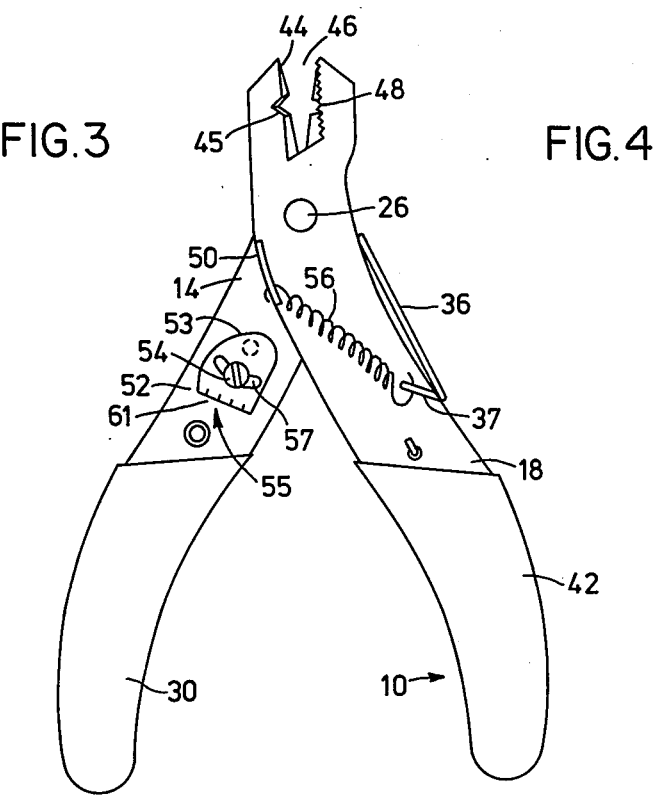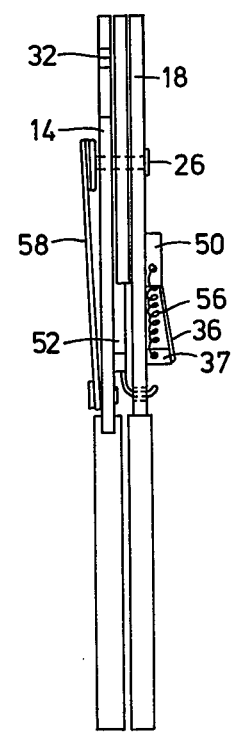

AUTOMATIC WIRE STRIPPER

BACKGROUND OF THE INVENTION

This invention relates to tools for cutting insulation on electrical wiring and in particular to a tool suitable for stripping insulation from an end portion of electrical wiring.

A number of tools are known for stripping insulation from electrical wiring. A well known and commonly used type of wire stripper is that shown and taught by U.S. Pat. No. 3,130,616. This tool teaches the use of a pair of cutting members, each of which forms a handle and has a cutting edge formed on one end. Each cutting edge has a V-shaped notch formed therein. The notches have sharpened edges and are adapted to cooperate to cut the insulation covering. The two cutting members are pivotally connected together by a pin member located close to the cutting edges. Mounted on the side of one of the cutting members is an adjustable stop provided to limit the movement of handles and thereby the cutting edges. Proper use of the stop prevents the metal wires in the wiring from being damaged. The aforementioned patent also teaches the use of a return spring which urges the handles apart.

U.S. Pat. No. 3,172,133 teaches a set of long nose pliers that can be used to strip electrical wiring. The wiring is stripped by use of notches providing on the pliers.

U.S. Pat. No. 3,336,666 dated Aug. 22, 1967 teaches an insulation cutting tool that is quite complex in its construction. The tool is designed to hold the wire being cut on both sides so that the inner wire will not be damaged. In the patent a jacket engaging device moves with the blade until the jacket is firmly engaged by the device. Then the device remains stationary as the blade moves further to cut the jacket.

A tool that is sold as a "wire stripper" is made by Ideal Industries Inc. of Sycamore, Ill., U.S.A. This tool has a series of notches along each of two cutting blades that are pivotally connected together. The notches accommodate electrical wiring of various standard sizes. Stop members formed on the handles of the tool prevent the cutting edges from severing the metal wire or wires in the insulation. With this tool it is necessary to pull the insulation off the wire or wires by pulling sideways on the tool after the insulation has been cut.

A rather complex automatic wire stripper is sold and distributed by Radio Shack, a division of Tandy Corporation. With this tool there is a pair of wire gripping jaws that holds the electrical wiring while the insulation is being cut by a separate set of blades having a series of notches formed therein. Again the notches accommodate standard electrical wiring of various sizes. The two blades do not close on each other until after the wire gripping jaws have engaged the electrical wiring. After the blades have cut the insulation, further movement of the two handles of the tool towards one another causes the blades to pivot away from the wire gripping jaws and this results in the insulation being stripped from the wire or wires.

An object of the present invention is to provide a wire stripping tool that will not only cut the insulation around the electrical wire or wires but will also remove the severed piece of insulation from the wire or wires.

A further object of the present invention is to provide a wire stripping tool capable of both cutting the insulation and removing it in a very efficient manner from the wire or wires extending through the severed piece of insulation, which tool is simple and reliable in its construction.

SUMMARY OF THE INVENTION

According to the present invention, a wire stripping tool for removing insulation from the end of electrical wiring comprises a first, elongate cutting member providing a first handle at one end and a first cutting edge at the opposite end thereof, said cutting edge including a wire-receiving notch. The tool further includes a second cutting member providing a second cutting edge having a wire-receiving notch therein and an elongate insulation removing member having a second handle at one end and an insulation pulling edge at the opposite end thereof; means are provided to pivotally connect together at a single location close to the cutting edges the first and second cutting members and the insulation removing member. Stop means prevent continued pivotal movement of the first cutting member relative to the second cutting member beyond a selected point. Spring means are connected at one end to the insulation removing member and at the opposite end to the second cutting member and the spring means act to bias the insulation removing member to a position where the pulling edge is beside the second cutting edge. The pulling of the handles towards one another initially closes the cutting edges to cut the insulation near the end of a piece of electrical wiring. The stop means and the notches prevent the electrical wire or wires in the wiring from being cut. Continued pulling of the handles towards one another draws the severed end of the insulation off the wire or wires to expose the latter.

Preferably the insulation removing member has a recess extending inwardly from the opposite end thereof. One side of this recess forms the insulation pulling edge and the opposite side is adapted to engage the severed end of the insulation as it is being pulled off the end of the wire or wires. The second cutting member is preferably sandwiched between the first cutting member and the insulation removing member, with all three members being pivotally connected to one another by means of a pivot pin extending through a hole in each member.

According to another aspect of the invention, a wire stripping tool for removing insulation from electrical wiring comprises first and second cutting members pivotally connected to one another and each having a cutting edge formed at one end. Each cutting edge forms a notch. The first cutting member is longer than the second cutting member and provides a handle at the end portion thereof furthest from the cutting edge. An insulation removing member having an insulation pulling edge at one end thereof and a handle at the opposite end thereof is pivotally connected to the cutting members. A stop member for prevent further pivotal movement of one cutting member relative to the other cutting member beyond a selected point is also provided together with means to bias the insulation removing member towards a position where the pulling edge is beside one of the cutting edges. The handles can be pulled towards one another and this action initially closes the cutting edges to sever a piece of insulation on the electrical wiring. Then, after the stop member is engaged, continued pulling moves the pulling edge away from the one cutting edge to draw the severed piece of insulation off the wire or wires in the wiring.

A preferred embodiment of the present invention will now be described, by way of example, with reference to the accompanying drawings.

BRIEF DESCRIPTION OF THE DRAWINGS

FIG. 1 is a side view of a wire stripping tool constructed in accordance with the present invention;

FIG. 2 is an edge view of the tool of FIG. 1, viewed from the left;

FIG. 3 is a side view of the wire stripping tool showing the side opposite that shown in FIG. 1;

FIG. 4 is an edge view of the tool of FIG. 1 viewed from the right;

DETAILED DESCRIPTION OF PREFERRED EMBODIMENT

Figure 5:
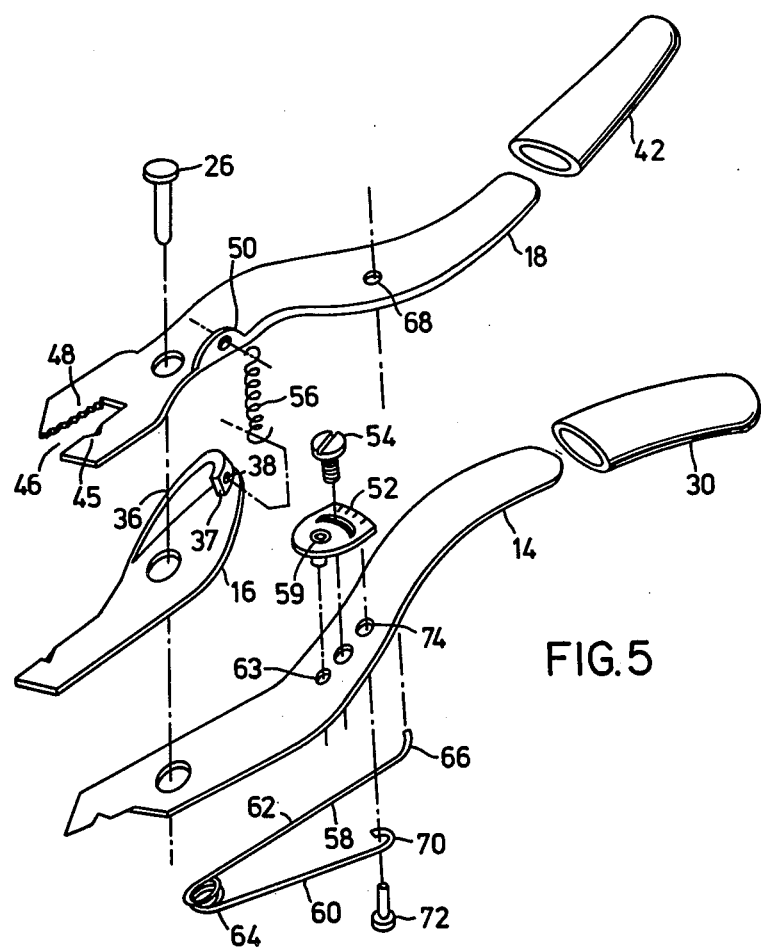
FIG. 5 is an exploded view showing the various parts of the wire stripping tool.
Figure 6:
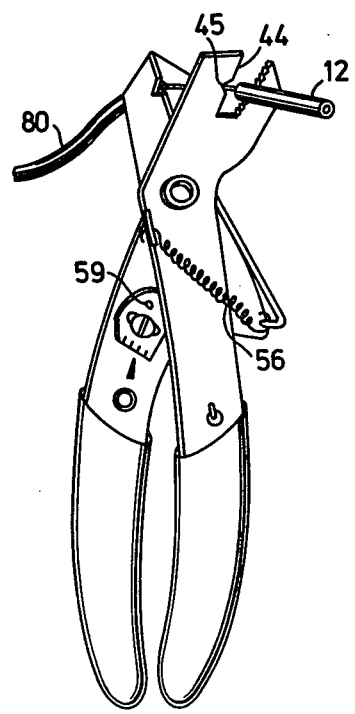
FIG. 6 is a detailed view showing the arrangement of the tool as it is completing the insulation removing process.

A wire stripping tool constructed in accordance with the present invention is shown in FIGS. 1 to 4. The tool 10 is designed to remove insulation, plastic or otherwise, from the end of a section of electrical wiring. A severed piece of insulation 12 is shown in FIG. 6. The tool is constructed from three main components including a first, elongate cutting member 14, a second cutting member 16, and an elongate insulation removing member 18. These three members are pivotally connected together at a single location indicated at 20 which is close to first and second cutting edges 22 and 24 formed on the cutting members. Preferably a rivet 26 is provided to connect together these three members. The rivet 26 extends through a round hole shown in FIG. 5 formed in each of the three members.

The first cutting member 14 has a first handle 28 formed at one end thereof. This handle can be covered with a plastic covering 30 to make it easier to grip and manoeuver. Preferably the cutting member 14 is bent along its length to form a slight S curve as shown in FIG. 1. The cutting edge 22 formed on the member 14 preferably has a V-shaped wire receiving notch 32. The use and construction of such notches is well known in the wire stripping art and a detailed description of the cutting edges and notches herein is not necessary. It will be appreciated that the two sides of the notch are sharpened in addition to the straight cutting edge formed on opposite sides of the notch.

The second cutting member 16 is substantially shorter than the first cutting member. In fact in the preferred embodiment shown, it is roughly one-half the length of the first cutting member. The cutting edge 24 on this member also has a V-shaped wire-receiving notch 34. The member 16 is curved along its length as shown in FIG. 5. Preferably it is also formed with a flange 36 which projects perpendicularly from one edge of the member in the direction of the insulation removing member 18. The flange tapers inwardly in the direction of the cutting edge as shown in FIG. 2. A small tab 37 projects perpendicularly from one end of the flange 36. A hole 38 is formed in the tab 37.

Turning now to the insulation removing member 18. This member provides a second handle 40 which is similar to the first handle 28. The handle 40 is also preferably encased in a plastic covering 42. The member 18 has an insulation pulling edge 44 at the end opposite the handle 40. Preferably this pulling edge is provided by one side of a recess 46 extending inwardly from the end of the insulation removing member 18. Preferably the pulling edge 44 is provided with a small V-shaped indentation 45 located adjacent the notch 34. This indentation results in the pulling edge extending into the notch 34 so that after the insulation has been severed by the cutting edges the indented pulling edge is able to enter into the cut and positively engage the end surface of the severed piece of insulation for the purpose of stripping off the severed piece as explained hereinafter.

As will be explained further hereinafter, the opposite side 48 of the recess is adapted to engage a severed end portion of the insulation as it is being pulled off the end of the metal wire or wires extending therethrough. The severed end portion is indicated at 12 in FIG. 6. Preferably the side 48 is serrated in a well known manner used in many pliers to assist this side in engaging the insulation. It will be noted from FIGS. 1 and 3 that the insulation removing member is bent along its length in the same manner as the first cutting member 14, that is, with a slight S-curve. In the region of the second cutting member 16, the curve in the member 18 corresponds to the curve in the cutting member 16. In the open position of the tool shown in FIGS. 1 and 3, the second cutting member 16 is aligned with the member 18 along its length. The member 18 is also provided with a tab or lug 50 mounted adjacent one edge of the member and extending in a direction away from the cutting member 16.

Stop means 52 are provided to prevent continued pivotal movement of the first cutting member 14 relative to the second cutting member 16 beyond a selected point. Preferably the stop means 52 comprises an adjustable stop member having a precisely shaped stopping edge 53. The member shown in FIG. 3 has several different settings with the particular setting that has been selected being indicated by the arrow 55. The member is connected to the first cutting member 14 by means of a screw 54 that extends through a curved slot 57 in the stop 52. The member is adjusted by rotating it about the axis formed by a circular depression 59 formed in the stop 52. The depression 59 forms a circular protrusion that extends into a circular hole 63 formed in the cutting member 14. Preferably the side 61 is numbered with the numbering corresponding to the most common sizes of electrical wiring. If the stop means 52 is correctly set, the metal wire or wires in the wiring will not be damaged when the insulation is cut by the tool 10. The wire or wires are protected because the stop means will not permit the opening formed by notches 32 and 34 to become so small or non-existent as to damage or sever the wire or wires.

Spring means are provided to bias the insulation removing member 18 to a position where the pulling edge 44 with the indentation 45 is beside the second cutting edge 24. In other words the spring means biases the member 18 towards the position shown in FIG. 3. In the preferred embodiment shown, the spring means comprises a coil spring 56. One end of the coil spring is connected to the tab 50 (by insertion through a hole formed therein) while the other end is connected to the tab 37. It will be appreciated that in the position shown in FIG. 3, the coil spring is in its relaxed state. In order for the second cutting member 16 to pivot relative to the insulation removing member 18, the spring 56 must be stretched. Thus the pulling force of the spring 56 will move the cutting member 16 with the member 18 as the handles are closed or pulled together. However as the handles are closed, the second cutting member 16 will eventually come into contact with the stop means 52 and this will prevent further pivotal movement of the member 16 relative to the other cutting member 14. Further pulling of the handles towards one another will then force the insulation removing member 18 to pivot relative to the second cutting member 16. This pivotal movement will stretch the spring 56. The stretching of the spring 56 is shown in FIG. 6. The indentation 45 in the pulling edge 44 will engage the end of the severed piece of insulation and push the insulation from the wire or wires therein as the pulling edge moves away from the cutting edge 24.

A further spring means 58 is preferably provided to bias the cutting members 14 and 16 towards the open position shown in FIGS. 1 and 3. The construction of the spring means 58 can be seen most clearly from FIG. 5. It has two straight arms 60 and 62 that extend out from a coil section 64. At the free end of the arm 62 is a perpendicular extension 66. The extension 66 fits through a hole 68 formed in the insulation removing member 18. After the extension 66 is passed through the hole 68, it may be bent over at its free end. The free end of the arm 60 is formed into a hook 70. This hook 70 passes around the projecting end of a rivet 72. The rivet 72 is mounted in a hole 74 formed in the center of the cutting member 14. The spring is relaxed in the position shown in FIG. 1 and it will resist the pulling of the handles of the tool towards one another. Release of pressure from the handles thus restores the tool to the open position shown in FIG. 1.

The operation of the tool of the present invention will be readily apparent to those skilled in the art from the above description. Briefly a section of electrical wiring such as the section 80 shown in FIG. 6 contains a single metal wire or several metal wires usually made of copper or aluminum. The wire or wires are encased in a layer of insulation 12. A piece of this insulation must be removed from the end of the wiring in order to connect the end to an electrical terminal such as for example that found on an electrical outlet. Not only must the insulation be removed but it is necessary to carry out this operation without damaging the metal wire or wires contained in the insulation. With the present tool it is possible to carry out this operation quickly and easily and usually with a single pulling of the handles 28 and 40 towards each other. The first step is to adjust the stop means 52 so that it is set at the correct position for the wiring being used. After this adjustment is made, the end of the wiring is placed between the open notches 32 and 34, with the notches being positioned at the precise location where the insulation is to be cut. The operator of the tool then pulls the handles towards each other. The initial movement of the handles closes the cutting edges 22 and 24 and cuts the insulation. Because the wire or wires in the wiring are located between the notches and because the stop means prevents the opening formed by the notches from being closed too much or completely, the wire or wires are protected from being cut. When one side of the stop means 52 engages the edge 82 of the second cutting member, the insulation is effectively cut. However it is still possible to pull the handle further towards one another and this continued pulling draws the severed end of the insulation off the wire or wires to expose the latter. The severed end is engaged by the indentation in pulling edge 44 as described earlier. The tool will also work quite well with a straight pulling edge 44 which will tend to dig into the side of the insulation. Because the wire or wires are held in place by the closed cutting members 16 and 18, the severed piece of insulation is forced along the wire or wires until it falls off or can be easily pulled off. The operation of the pulling edge is assisted by the serrated opposite side 48 of the recess. The side 48 keeps the severed piece of insulation in a position where it is readily engaged by the pulling edge 44. Thus the severed piece of insulation can not bend out of the way so that it will not be pulled off of the wire or wires by the edge 44.

The ability of the pulling edge 44 to pull off a severed piece of insulation is governed to some extent by the distance that this edge can move away from the closed cutting edges 22 and 24. This distance can be increased by moving the pivot point 20 further from the notches 32 and 34. Once one has selected the length of insulation that one wishes to remove from the end of the wiring, it is a straightforward matter to construct a tool according to the present invention which will cleanly strip the selected length.

It will be readily appreciated that various modifications can be made to the wire stripping tool of the present invention without departing from the spirit and scope of the present invention. For example, springs other than the type shown could be used to bias the various members to the required positions. An alternative form of stop means could be employed.

What I claim as my invention is:

1. A wire stripping tool for removing insulation from the end of electrical wiring comprising a first, elongate cutting member providing a first handle at one end and a first cutting edge at the opposite end thereof, said cutting edge including a wire-receiving notch; a second cutting member providing a second cutting edge having a wire-receiving notch therein; an elongate insulation removing member having a second handle at one end and an insulation pulling edge at the opposite end thereof; means for pivotally connecting together at a single location close to said cutting edges said first and second cutting members and said insulation removing member; stop means for preventing continued pivotal movement of said first cutting member relative to said second cutting member beyond a selected point; and spring means connected at one end to said insulation removing member and at the opposite end to said second cutting member, said spring means acting to bias said insulation removing member to a position where said pulling edge is beside said second cutting edge, wherein the pulling of said handles towards one another initially closes the cutting edges to cut insulation near the end of a piece of electrical wiring, said stop means and said notches preventing the electrical wire or wires in said wiring from being cut, and continued pulling of said handles towards one another draws the severed end of the insulation off the wire or wires to expose the latter.

2. A wire stripping tool according to claim 1 wherein said insulation removing member has a recess extending inwardly from said opposite end thereof, one side of said recess forming said insulation pulling edge and the opposite side adapted to engage the severed end of the insulation as it is being pulled off the end of the wire or wires.

3. A wire stripping tool according to claim 1 wherein said second cutting member is sandwiched between said first cutting member and said insulation removing member, all three members being pivotally connected to one another by means of a pivot pin extending through a hole in each member.

4. A wire stripping tool according to claim 3 including further spring means connected to said first cutting member and said insulation removing member and biasing said first cutting member and said insulation removing member towards an open position where said handles and cutting edges are separated.

5. A wire stripping tool according to claim 4 wherein said first mentioned spring means is connected to the end of said second cutting member furthest from the cutting edge thereof and is located on the side of the insulation removing member opposite said second cutting member.

6. A wire stripping tool according to claim 4 wherein said second cutting member is substantially shorter than said first cutting member and is in substantial side-by-side alignment with said insulation removing member when said further spring means is relaxed.

7. A wire stripping tool according to claim 1 wherein said pulling edge is formed with an indentation that extends into said notch in said second cutting edge when said pulling edge is beside said second cutting edge.

8. A wire stripping tool for removing insulation from electrical wiring comprising first and second cutting members pivotally connected to one another and each having a cutting edge formed at one end, each cutting edge forming a notch, said first cutting member being longer than the second cutting member and providing a handle at the end portion thereof furthest from the cutting edge; an insulation removing member having an insulation pulling edge at one end thereof and a handle at the opposite end thereof, said insulation removing member being pivotally connected to said cutting members; a stop member for preventing further pivotal movement of one cutting member relative to the other cutting member beyond a selected point; and means to bias said insulation removing member towards a position where said pulling edge is beside one of said cutting edges, wherein said handles can be pulled towards one another, which action initially closes said cutting edges to sever a piece of insulation on said electrical wiring and then, after said stop member is engaged, moves said pulling edge away from said one cutting edge to draw the severed piece of insulation off the wire or wires in said wiring.

9. A wire stripping tool according to claim 8 wherein said insulation removing member has a longitudinally extending recess formed in said one end thereof, said recess having two opposed sides one of which forms said insulation pulling edge, the side opposite said one side adapted to engage the severed piece of insulation during said drawing off step.

10. A wire stripping tool according to claim 9 wherein said biasing means is a coil spring connected at one end to said insulation removing member and at the other end to said second cutting member.

11. A wire stripping tool according to claim 9 wherein said stop member is adjustable to permit the stripping of electrical wiring of various sizes and is mounted on one side of said first cutting member by means of a screw extending through a curved slot formed in said stop member.

12. A wire stripping tool according to claim 11 wherein said stop member has a circular protrusion which extends into a hole in said first cutting member, said circular protrusion acting as a pivot point for adjustment of said stop member.

13. A wire stripping tool according to claim 8 wherein said pulling edge has an indentation formed therein whereby the pulling edge extends into one of the notches when said pulling edge is beside said one cutting edge.

14. A wire stripping tool according to claim 9 wherein said pulling edge has an indentation formed therein whereby the pulling edge extends into one of the notches when said pulling edge is beside said one cutting edge.

* * * * *